United States Patent [19]
Shih

[11] Patent Number: 5,375,130
[45] Date of Patent: Dec. 20, 1994

[54] AZIMUTHAL AND RADIAL POLARIZATION FREE-ELECTRON LASER SYSTEM

[75] Inventor: Chun-Ching Shih, Palos Verdes Estates, Calif.

[73] Assignee: TRW Inc., Redondo Beach, Calif.

[21] Appl. No.: 62,642

[22] Filed: May 13, 1993

[51] Int. Cl.$^5$ ............................ H01S 3/10; G02F 1/09
[52] U.S. Cl. ........................................ 372/2; 359/483; 372/69
[58] Field of Search ................. 385/11; 359/483, 484, 359/487; 372/2, 69, 74, 92, 106

[56] References Cited

U.S. PATENT DOCUMENTS

| | | | |
|---|---|---|---|
| H1,155 | 3/1993 | Fratello et al. | 359/484 |
| 3,777,280 | 12/1973 | Pohl | 372/19 |
| 4,531,216 | 7/1985 | Tyler | 372/9 |
| 4,712,880 | 12/1987 | Shirasaki | 359/484 |
| 4,852,962 | 8/1989 | Nicia | 359/484 X |
| 5,198,923 | 3/1993 | Watanabe et al. | 359/484 X |

*Primary Examiner*—Akm E. Ullah

[57] ABSTRACT

A free-electron laser system and optical polarization conversion are provided for producing azimuthal polarization and radial polarization laser beams. The free-electron laser system includes a helical wiggler for generating a transverse magnetic field around a beam axis. An electron beam is projected along the beam axis and interacts with the transverse magnetic field so as to induce spontaneous and stimulated emission of optical radiation. A resonator cavity is formed by a pair of mirrors in which the optical radiation oscillates therein. The laser system directly produces an azimuthal polarization laser beam as an output. The laser system may further be coupled to an optical polarization converter which includes a pair of optical half-wave plates having a forty-five degree (45°) optical axis difference therebetween. The azimuthal polarization laser beam is transmitted through the optical polarization converter so as to generate a radial polarization output beam. The optical polarization converter may further operate as a bi-directional optical polarization converter for converting between azimuthal polarization and radial polarization laser beams. In addition, optical polarization converter may further operate with other optical axis differences so as to provide a general polarization rotator for rotating polarization according to directions based on selected arbitrary angles.

17 Claims, 5 Drawing Sheets

AZIMUTHAL AND RADIAL POLARIZATION FREE-ELECTRON LASER SYSTEM

BACKGROUND OF THE INVENTION

1. Technical Field

This invention relates generally to laser systems and, more particularly, to a polarizing free-electron laser system and polarization conversion for producing azimuthal and radial polarization laser beams.

2. Discussion

The polarization of a laser beam is a characteristic in which the electric field thereof is controlled with respect to the propagation direction of the beam. Different types of polarization exist which are selected so that the electric field is oriented in a predictable fashion, depending on a particular application. Conventional laser systems have been developed which commonly generate a linearly polarized beam. According to these conventional approaches, the linear polarization is generally accomplished by employing a planar Brewster window oriented at the Brewster angle (i.e., polarizing angle) within the laser region. The planar Brewster window is usually made of a transparent dielectric material such as glass or dichroic material which has a known index of refraction. Accordingly, light with a polarization parallel to the incidence plane of the planar Brewster window is transmitted therethrough, while light with a polarization normal thereto is partially reflected there from.

In the past, other types of polarization have been produced which include circular and elliptical polarization. More recently, developments in the areas of holography, interferometry, spectroscopy, photochemistry and accelerator technology now and in the future may require laser beams in a special polarization state known as radial polarization. In particular, a radially polarized laser beam can advantageously be focused by axicon-type optics so as to generate a very strong longitudinal electromagnetic field in the focal region thereof. In effect, radially polarized laser beams could therefore be used to provide an accelerating mechanism for present and future-generation accelerators such as high energy (i.e., gigavolt) accelerators.

Currently, existing laser systems have been able to generate radial polarization beams using very complex optical schemes. These schemes generally involve converting a linearly polarized beam into a radially polarized beam through a series of beam rotations and combinations with external conversion optics. However, existing external conversion systems are rather complex since the conversion generally requires special optical elements such as a spiral waveplate which is very difficult to fabricate in the optical region. In addition, prior approaches generally further require a substantially uniform beam profile which results in rather stringent requirements.

One particular type of laser known as the free-electron laser (FEL) generally involves the passage of a beam of electrons through a spatially varying magnetic field which in effect causes the electron beam to wiggle and hence to radiate. Free-electron lasers generally include a wiggler configuration which affects the electron motion and therefore the polarization of the laser beam. According to conventional wiggler approaches, the linear wiggling motion of electrons is able to generate a linear polarization optical field, while a circularly orbiting electron beam radiates a circularly polarized optical field.

While conventional free-electron lasers have shown the ability to produce linear and circular polarization, the generation of other types of polarization generally require complex electron beam focusing arrangements. For instance, in order to generate radial polarization, the electron beam in a conventional free-electron laser generally has to be focused and defocused in a distance of a wiggler period so that the electrons have the same radial motion simultaneously. However, it is generally difficult to focus the beam to have a significant radial velocity component due to limiting factors such as the space charge effect. As a result, tile direct generation of a radial polarization beam from a free-electron laser is usually not very practical.

It is therefore desirable to provide for an enhanced approach for obtaining a laser output beam having a radial polarization. In addition, it is desirable to provide for a laser system which generates a radial polarization output beam without the need for any overly complex external conversion optics. Furthermore, it is desirable to provide an optical polarization conversion for converting azimuthally polarized optical radiation to radially polarized optical radiation so that a free-electron laser may indirectly produce radial polarization therewith. It is further desirable to provide for such an optical polarization conversion for converting between azimuthal and radial polarization optical radiation.

SUMMARY OF THE INVENTION

In accordance with the teachings of tile present invention, a free-electron laser system and optical polarization converter are provided for producing azimuthal polarization and radial polarization laser beams. The laser system includes a wiggler for generating a transverse magnetic field around an axis. An electron beam is projected along the axis and interacts with the magnetic field so as to induce spontaneous emission of optical radiation. The radiation oscillates within a resonator cavity formed by a pair of mirrors. The laser system directly produces an azimuthal polarization laser beam as a direct output. The laser system may further be coupled to an optical polarization converter which includes a pair of optical half-wave plates having a forty-five degree (45°) optical axis difference therebetween. The azimuthal polarization laser beam is transmitted through the optical polarization converter so as to generate a radial polarization output beam. The optical polarization converter may further operate as a hi-directional optical polarization converter for converting between azimuthal polarization and radial polarization optical radiation.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENT

Figure 1:
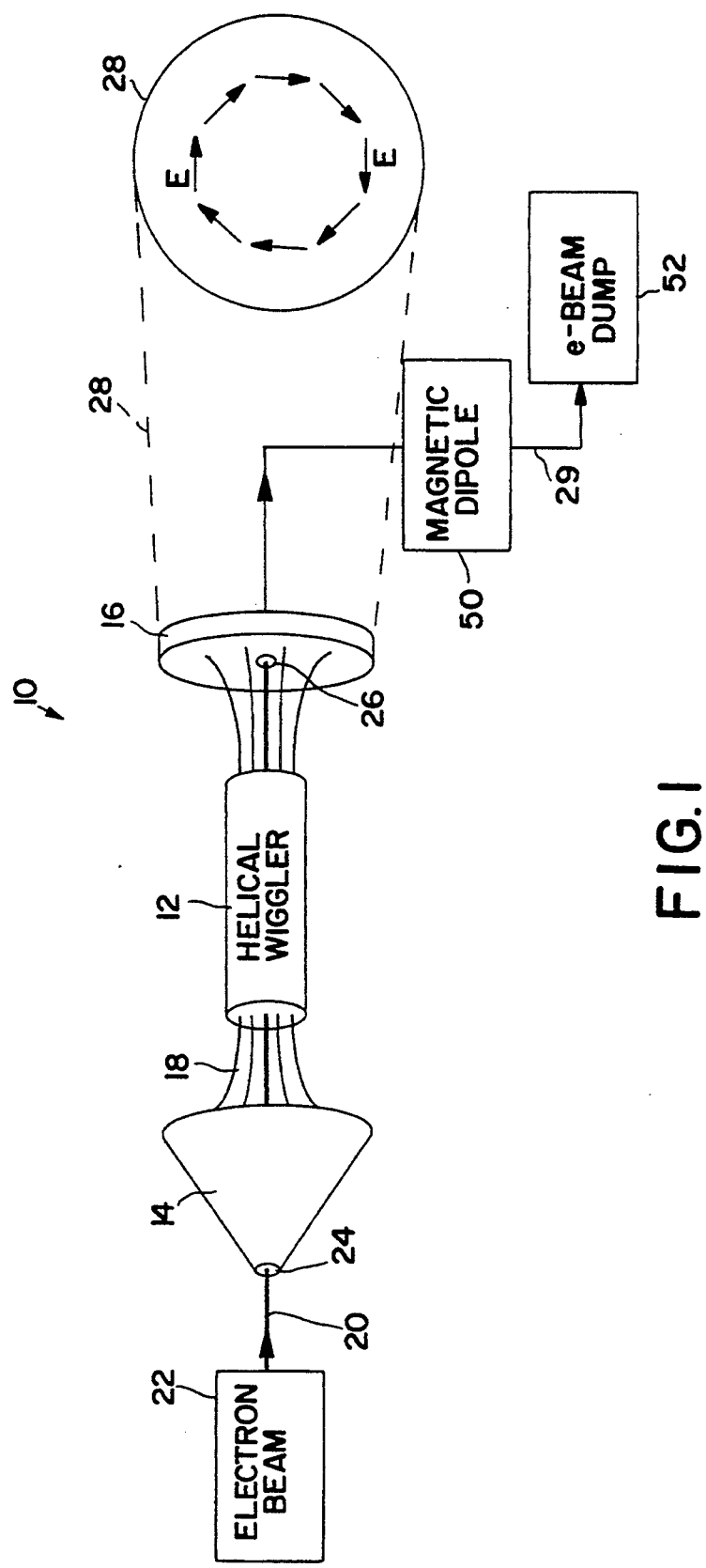
FIG. 1 is a schematic representation of a free-electron laser employing a helical wiggler in accordance with the present invention for producing an azimuthal polarization laser beam.

Turning now to FIG. 1, a free-electron laser (FEL) 10 is shown therein for directly producing an azimuthal polarization laser beam 28. The azimuthal polarization laser beam 28 may further be converted to a radial polarization beam according to one feature of the present invention, in addition, another feature of the present invention will further be described herein according to an optical polarization converter for converting between azimuthally polarized optical radiation 28 and radially polarized optical radiation 40.

The free-electron laser 10 includes a helical wiggler 12 disposed between a pair of opposing resonator mirrors 14 and 16. Reflective resonator mirrors 14 and 16 oppose one another so as to define a laser resonator cavity 18 which is the reflective region therebetween extending along a longitudinal beam axis 20. According to this arrangement, optical radiation that is projected along beam axis 20 is repetitively reflected back and forth (i.e., oscillates) between resonator mirrors 14 and 16. The oscillating radiation remains in the resonator cavity 18 long enough to build up a strong oscillation according to the desired output level.

Resonator mirror 14 is a highly reflective conical-shaped end mirror which has an opening 24 located in a center region thereof along beam axis 20 for allowing an input electron beam 22 to pass therethrough. Resonator mirror 16 is a planar-shaped partial transmission mirror which operates to reflect a substantial amount of optical radiation back toward the opposing reflective end mirror 14, while allowing a portion of the energy oscillating within the resonator cavity 18 to pass therethrough as the laser output 28. That is, partial transmission mirror 16 operates both as a reflection mirror and also as an output transmission medium. In doing so, partial transmission mirror 16 provides approximately a ninety-eight to ninety-nine percent (98–99%) effective reflection of the oscillating radiation incident thereto along axis 20, while allowing the remaining one or two percent (1–2%) to effectively pass therethrough along axis 20 as laser output 28.

Figure 4:
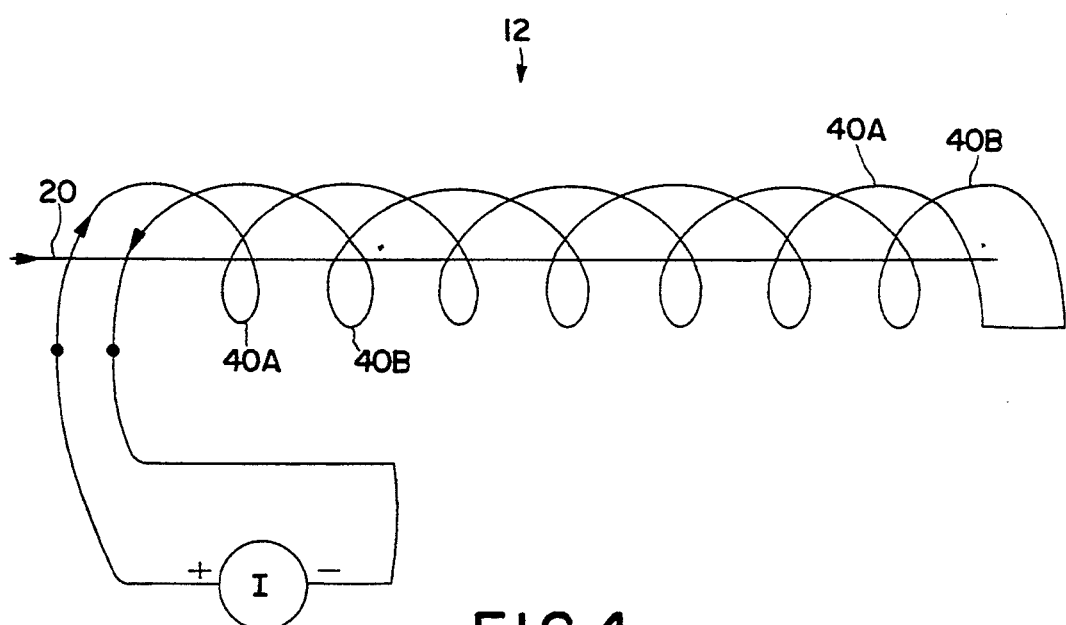
FIG. 4 is a schematic representation of a double-helix wiggler employed by the free-electron laser in accordance with a preferred embodiment of the present invention.

The helical wiggler 12 is shown in detail in FIG. 4 according to a preferred embodiment which includes a double-helix wiggler coil 40 that has a pair of interconnected multi-turn conductive coils 40A and 40B. According to this double-helix wiggler coil arrangement, coils 40A and 40B have interspaced conductive loops which have a coil axis substantially aligned with said beam axis 20. Coils 40A and 41)B are electrically coupled to a current source I. Current flow across coils 40A and 40B creates opposing magnetic fields along axis 20 which substantially cancel one another, while inducing a transverse magnetic field H that rotates around beam axis 20.

Figure 5:
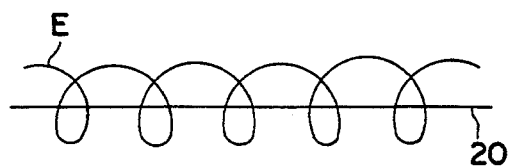
FIG. 5 is a schematic representation of the collective electron movement generated with the free-electron laser according to the present invention.

The polarization of the optical field produced in a free-electron laser is generally determined by the wiggler configuration which affects the electron motion. Accordingly, using high current in the helical configuration as described herein produces high transverse magnetic field H and causes the electrons to move around the axis 20 collectively so as to interact with the radiation whose electric field E has an azimuthal orientation as shown in FIG. 5. While a double-helix wiggler coil 40 is described herein, other helical coils such as a single coil could be employed, however, a double-helix coil provides a substantially transverse magnetic field H which leads to a more effective interaction between the electrons and the radiation.

According to the free-electron laser 10 described herein, an electron beam 22 is projected along axis 20 through opening 24 so as to enter resonator cavity 18. The electron beam 22 is transmitted through the helical wiggler 12 and interacts with transverse magnetic field H induced by helical wiggler 12. The interaction of electron beam 22 and transverse magnetic field H thereby creates a spontaneous emission of optical radiation. The induced optical radiation oscillates within resonator cavity 18 and induces the stimulated radiation by interacting with the electrons until transmission from partial transmission mirror 16. The resulting laser output beam 28 that is directly produced by free-electron laser 10 has an azimuthal polarization. That is, the electric field E of the laser output beam in relation to the direction of propagation along beam axis 20 substantially assumes an azimuthal orientation as shown by azimuthal polarization laser beam 28. A magnetic dipole 50 is further included for magnetically deflecting spent electrons 29 exiting the laser 10 which arc deflected to an electron beam dump 52.

The free-electron laser 10 described herein directly produces an azimuthal polarization laser output 28 which may be advantageously employed for such purposes of providing a more uniform focused beam for material processing or micro-lithography among other applications. However, there exists an increasing need to obtain enhanced methods for generating a radial polarization laser beam for high energy accelerator applications. Thus, while the free-electron laser 10 thus far described herein directly produces an azimuthal polarization laser beam 28, the azimuthal polarization beam 28 may be converted to a radial polarization laser beam 40 in accordance with the present invention as illustrated in FIG. 2.

Figure 2:
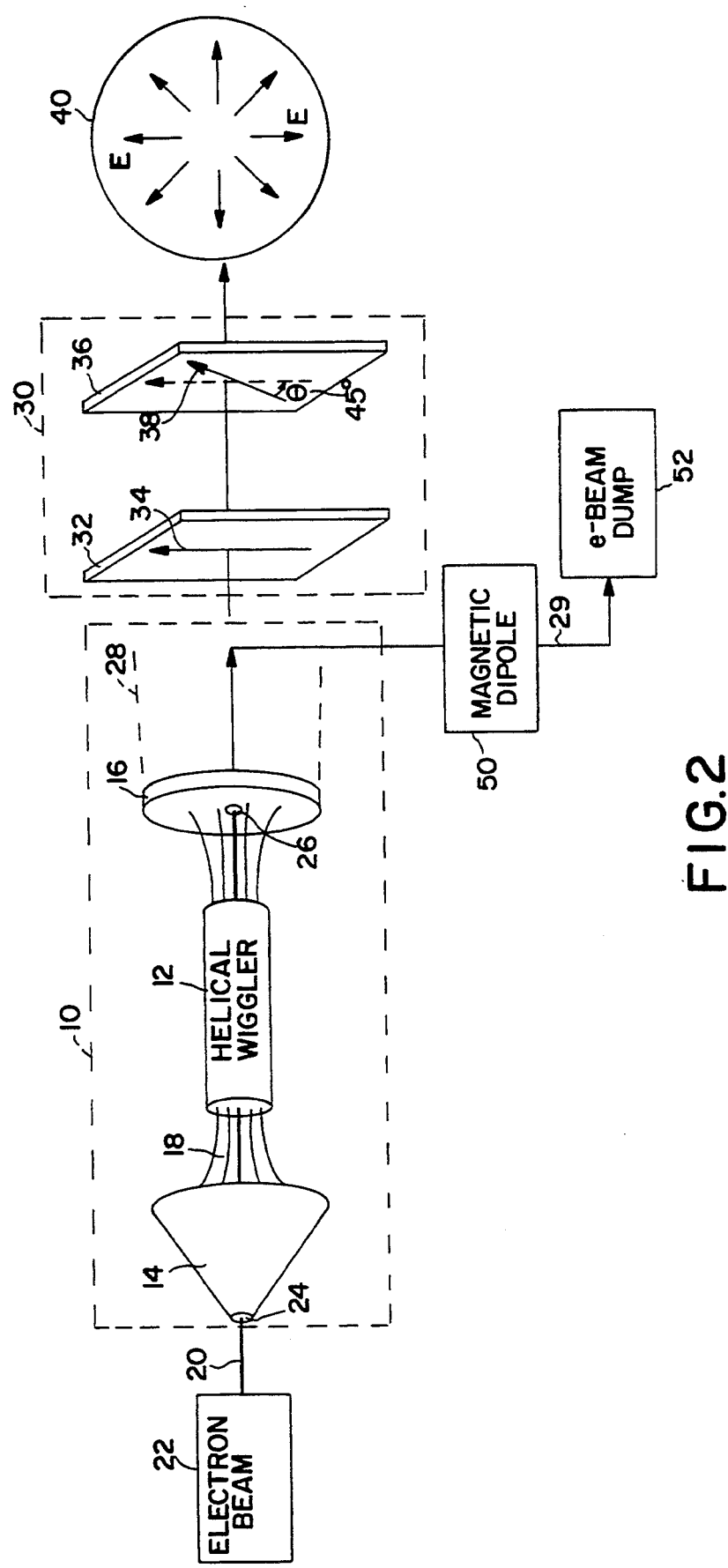
FIG. 2 is a schematic representation of the free-electron laser coupled to an optical polarization converter for providing a radial polarization laser beam in accordance with the present invention.

With particular reference to FIG. 2 an optical polarization converter 30 is shown coupled to the output of free-electron laser 10 for purposes of converting the azimuthal polarization laser beam 28 to a radial polarization laser beam 40. Optical polarization converter 30 includes a pair of optical half-wave plates 32 and 36 located substantially parallel to one another. First and second optical half-wave plates 36 are made of a transparent material such as Lithium Niobate ($LiNbO_3$) and Potassium Dihydrogen Phosphate (KDP), each of which has a substantially unidirectional optical axis. Accordingly, first optical half-wave plate 32 has a first optical axis 34. Second optical half-wave plate 36 likewise has a second optical axis 38, which is rotated by $\theta$=forty-five degrees (45°) from the direction of the first optical axis 34. Optical polarization converter 30 thereby operates as a ninety degree (90°) polarization rotator without any requirements relating to the direction of polarization with respect to the optical axis.

Figure 3:
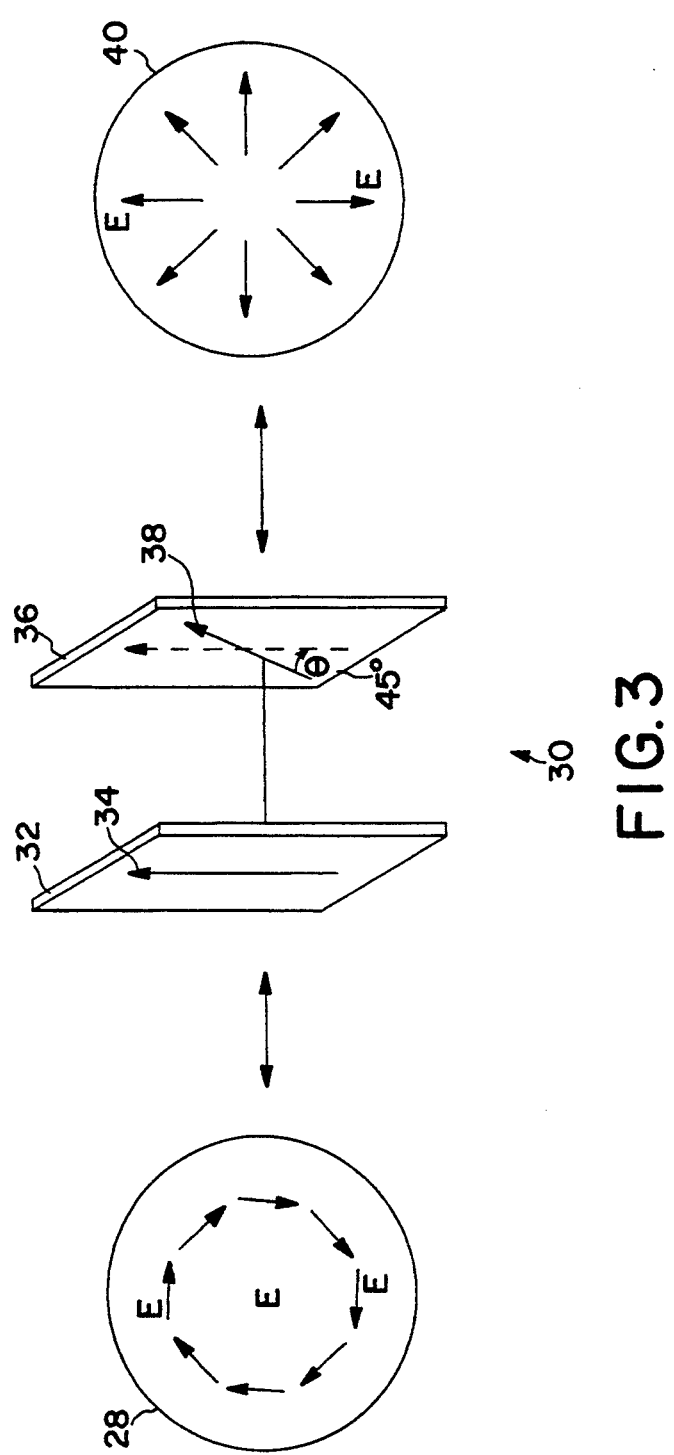
FIG. 3 is a block diagram of an optical polarization converter employed for converting between azimuthal polarization and radial polarization optical radiation in accordance with the present invention.

The optical polarization converter 30 may further operate as a bi-directional polarization converter as shown in FIG. 3. That is, on the one hand, optical polarization converter 30 may operate as a polarization rotator for converting an azimuthal polarization laser beam 28 into a radial polarization laser beam 40. Oil the other hand, optical polarization converter 30 may also operate to convert a radial polarization laser beam 40 into an azimuthal polarization laser beam 28. Optical polarization converter 30 thereby operates as a universal polarization rotator for producing ninety degree (90°) polarization rotations.

Figure 6:
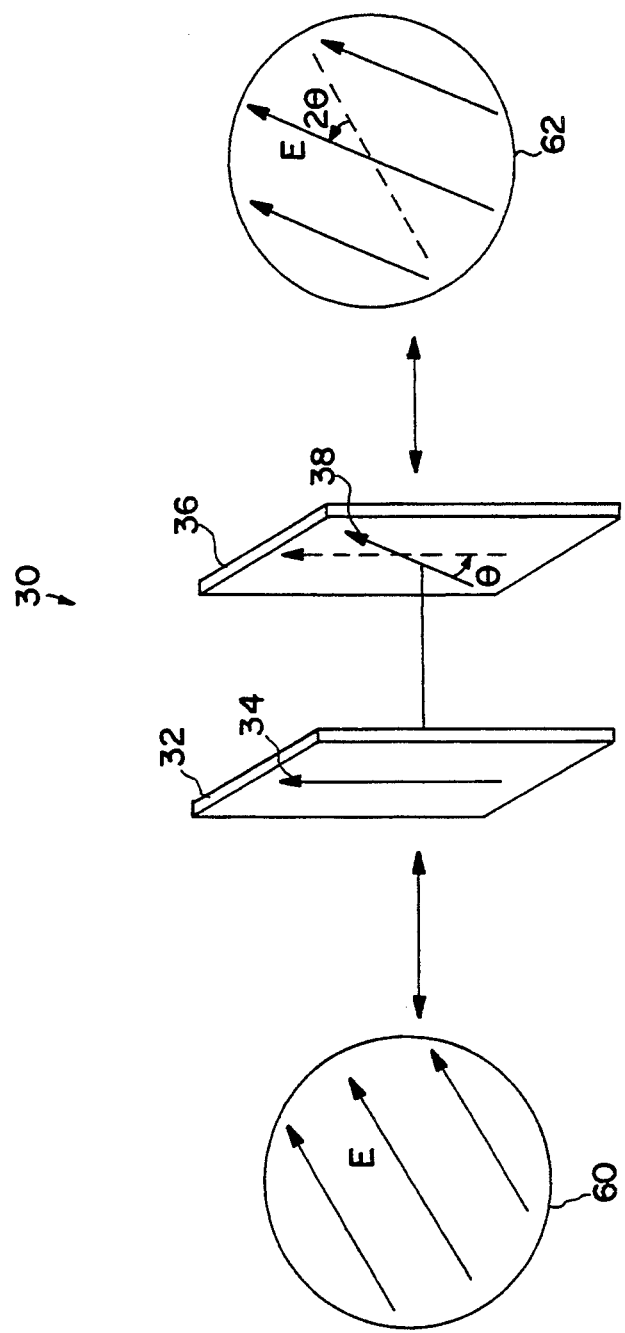
FIG. 6 is a schematic representation of the optical polarization converter used for rotating the polarization of an optical beam according to another embodiment of the present invention.

In addition, the optical polarization converter 30 described herein can be further used as a universal adjustable polarization rotator for rotating the polarization of an optical beam according to directions based on selected angles as shown in FIG. 6. Accordingly, the electric field E of an optical beam such as linearly polarized beam 60 may be rotated by twice the angle $\theta$ so as to produce a rotated polarized beam 62. Disregarding the direction of polarization, tile polarization will be rotated by an angle twice as large as the optical axis angular separation $\theta$, i.e., rotated by 20.

In operation, the free-electron laser 10 receives an electron beam 22 via opening 24 located in resonator mirror 14. The electron beam 22 is transmitted along the longitudinal beam axis 20 and through the center portion of helical wiggler 12. Helical wiggler 12 induces a transverse magnetic field H therein which interacts with electron beam 22 so as to generate tile spontaneous emission of optical radiation. The optical radiation in turn is reflected between resonator mirrors 14 and 16 (i.e., oscillates) and is able to induce stimulated emission and build up to a desired power level. Partial transmission resonator mirror 16 further operates to allow a portion of the oscillating optical radiation to be transmitted therethrough as a laser output beam. The laser output beam directly generated from free-electron laser 10 has an azimuthal polarization 28.

The azimuthal polarization 28 may be converted to a radial polarization 40 by transmitting the laser output beam through a pair of optical half-wave plates 32 and 36 which have a forty-five degree (45°) angular difference between respective optical axes 34 and 38. Accordingly, the laser beam output is rotated 90° so that the azimuthal polarization 28 is converted to radial polarization 40. The resulting radial polarization laser beam 40 may advantageously be employed for purposes of providing a high longitudinal electric field suitable for use with present and future high energy accelerators.

While optical polarization converter 30 advantageously provides a conversion from an azimuthal polarization 28 to a radial polarization 40, the optical polarization converter 30 may also operate to convert a radial polarization 40 into an azimuthal polarization 28. Accordingly, optical polarization converter 30 acts as a bidirectional ninety degree (90°) rotator. By varying the angular difference of the first and second optical axes 34 and 38, the optical polarization converter 30 can operate as a general polarization rotator for selected arbitrary angles. Thus, while optical converter 30 has been disclosed in conjunction with a free-electron laser 10, it is conceivable that optical polarization converter 30 may be employed for other polarization rotating purposes.

In view of the foregoing, it can be appreciated that the present invention enables the user to achieve a laser system 10 and optical conversion 30 for producing azimuthal and radial polarization laser beams 28 and 40 as well as optical polarization conversions therebetween. Thus, while this invention has been disclosed herein in combination with a particular example thereof, no limitation is intended thereby except as defined in the following claims. This is because a skilled practitioner recognizes that other modifications can be made without departing from the spirit of this invention after studying the specification and drawings.

What is claimed is:

1. A free-electron laser system comprising:
   means for receiving an electron beam projected along a beam axis;
   wiggler means including a current transmitting multi-turn coil for generating a transverse magnetic field around said axis which interacts with said electron beam so as to induce spontaneous emission of optical radiation;
   resonator means forming a resonator cavity in which said optical radiation may oscillate therein; and
   output means for providing an azimuthal polarization laser beam.

2. The laser system as defined in claim 1 further comprising:
   conversion means for converting said azimuthal polarization to radial polarization.

3. The laser system as defined in claim 2 wherein said conversion means comprises:
   a first half-wave plate having a first optical axis; and
   a second half-wave plate having a second optical axis rotated forty-five degrees (45°) relative to said first optical axis, said second half-wave plate arranged substantially parallel to said first half-wave plate.

4. The laser system as defined in claim 1 wherein said resonator means comprises:
   a highly reflective end mirror; and
   a partial transmission mirror having a reflective surface opposing said end mirror and a transmission medium for providing said output beam.

5. The laser system as defined in claim 1 wherein said wiggler means comprises:
   a helical shaped multi-turn coil having an axis substantially located along said beam axis and an electric source for transmitting a current through said coil so as to induce said transverse magnetic field.

6. The laser system as defined in claim 5 wherein said helical shaped coil comprises a pair of helical multi-turn coils.

7. A free-electron laser system comprising:
   means for receiving an electron beam directed along a beam axis;
   wiggler means for generating a transverse magnetic field around said beam axis which interacts with said electron beam so as to induce spontaneous and stimulated emission of optical radiation;
   resonator means forming a resonator cavity in which said optical radiation may oscillate therein;
   laser output means for providing an azimuthal polarization laser beam; and
   conversion means coupled to said laser output means for converting said azimuthal polarization laser beam to a radial polarization laser beam, said conversion means including a first half-wave plate having a first optical axis and a second half-wave plate having a second optical axis which is rotated forty-five degrees (45°) relative to said first optical axis.

8. The laser system as defined in claim 7 wherein said second half-wave plate is arranged substantially parallel to the first half-wave plate.

9. The laser system as defined in claim 7 wherein said wiggler means comprises:
a helical shaped multi-turn coil having a coil axis substantially located along said beam axis and an electric source for transmitting a current through said coil so as to induce said magnetic field.

10. The laser system as defined in claim 9 wherein said helical shaped coil comprises a pair of helical multi-turn coils.

11. An optical polarization converter for converting between azimuthal and radial polarization optical radiation comprising:
a first half-wave plate having a first optical surface and a first optical axis;
a second half-wave plate having a second optical surface located substantially parallel to said first optical surface and further having a second optical axis rotated forty-five degrees (45°) relative to said first optical axis;
input means for receiving one of an azimuthal polarization or radial polarization laser beam; and
output means for providing the other of said azimuthal polarization or radial polarization laser beam.

12. The optical polarization converter as defined in claim 11 wherein said first and second optical half-wave plates each comprises substantially unidirectional optical material.

13. An optical polarization rotator comprising:
a first half-wave plate having a first optical surface and a first optical axis;
a second half-wave plate having a second optical surface located substantially parallel to said first optical surface and further having a second optical axis rotated by a selected angle $\theta$ relative to said first optical axis;
input means for receiving an input optical beam having a first polarization; and
output means for providing an output optical beam having a second polarization which is rotated by twice the selected angle $\theta$ of said first polarization.

14. The optical polarization converter as defined in claim 13 wherein said first and second optical half-wave plates each comprises substantially unidirectional optical material.

15. A method for producing an azimuthal polarization laser beam comprising:
receiving an electron beam along a beam axis;
generating a transverse magnetic field along said beam axis which interacts with said electron beam so as to induce spontaneous and stimulated emission of optical radiation;
oscillating said optical radiation within a resonator cavity; and
providing an azimuthal polarization laser beam output.

16. The method as defined in claim 15 further comprising the steps of transmitting said azimuthal polarization laser beam output through a pair of parallel half-wave plates which have a forty-five degree (45°) optical axis separation therebetween so as to generate a radial polarization laser beam.

17. The method as defined in claim 15 wherein the step of generating a transverse magnetic field comprises transmitting a current through a multi-turn coil.

* * * * *